INVENTOR
JOSEPH PUFAHL

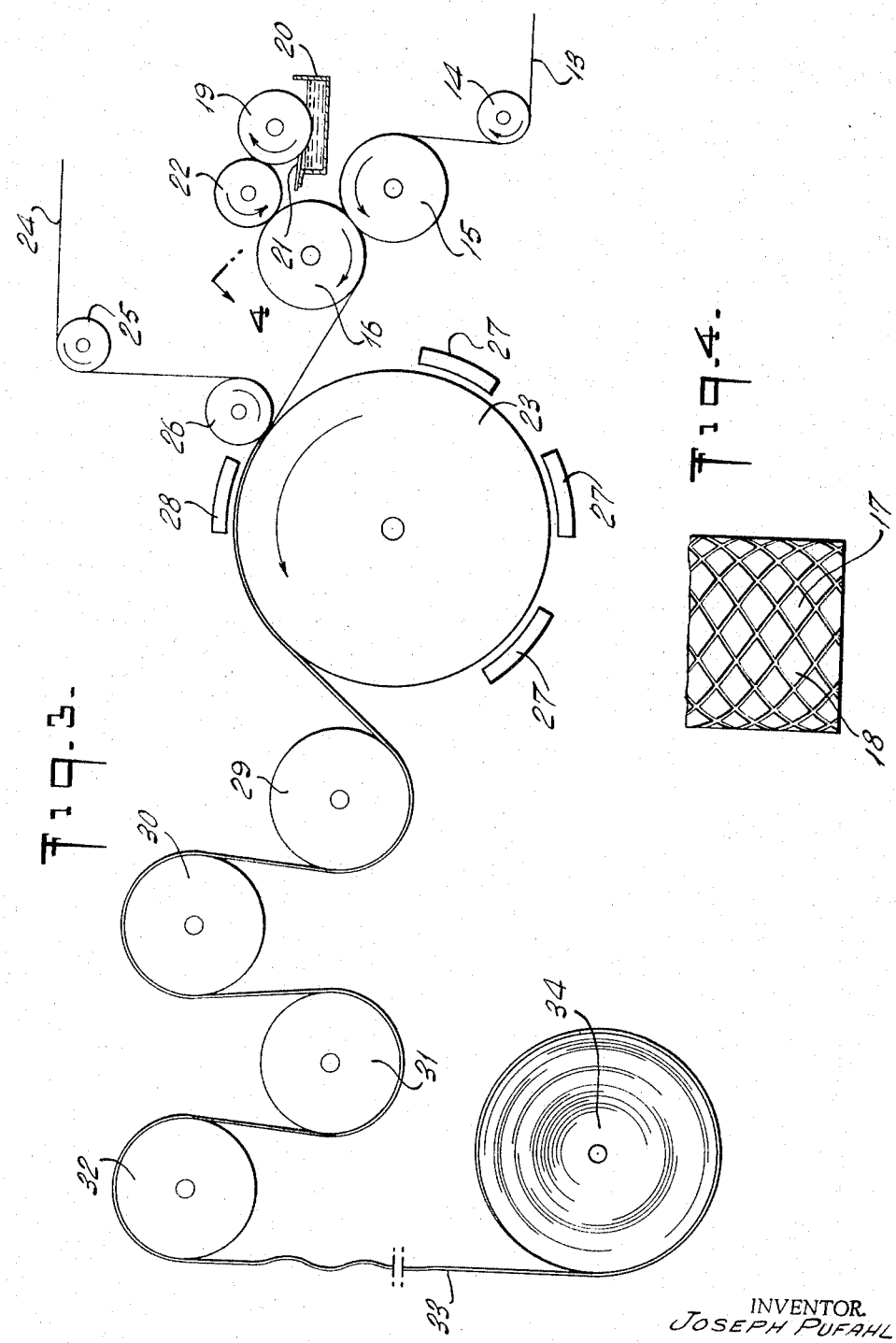

INVENTOR.
JOSEPH PUFAHL
BY
ATTORNEY

United States Patent Office 3,316,136
Patented Apr. 25, 1967

3,316,136
METHOD AND APPARATUS FOR MAKING COMPOSITE CONTOURED FABRIC
Joseph Pufahl, 81 Gerard Ave.,
New Hyde Park, N.Y. 11040
Filed May 27, 1963, Ser. No. 283,522
7 Claims. (Cl. 156—160)

This invention relates to composite fabrics and more specifically to a novel and improved contoured fabric and to the manufacture thereof.

Numerous procedures have heretofore been suggested for the manufacture of quilted material embodying both regular and irregular designs. These procedures have involved the utilization of a resilient material or fabric between a pair of outer layers, with the outer layers being drawn together by stitching or cementing processes in order to form a design or ornamental configuration on at least one surface of the completed material. With this arrangement, the resilient material tends to urge the outer layers apart through the areas defined by the surrounding stitches and thus form a sequence of so-called "puffed" areas directly supported by the resilient material.

The fabric in accordance with this invention provides an unusual, decorative contour through a new and improved mode of joining overlying layers of material which automatically produces a unique and attractive ornamental effect. Accordingly, it is one object of the invention to provide a novel and improved contoured material that is characterized by its relatively low cost, decorative quality, and ease of manufacture and maintenance.

Another object of the invention resides in the provision of a novel and improved method for manufacturing contoured materials.

Still another object of the invention resides in the provision of novel and improved apparatus for manufacturing contoured materials.

The above and other objects and advantages of the invention will become more apparent from the following description and accompanying drawings forming part of this application.

In the drawings:

FIGURE 3 is a diagrammatic view of apparatus in accordance with the invention for manufacturing the fabric as illustrated in FIGURES 1 and 2.

FIGURE 4 is a fragmentary section of the surface of the adhesive printing roller shown in FIGURE 3.

Figure 6:
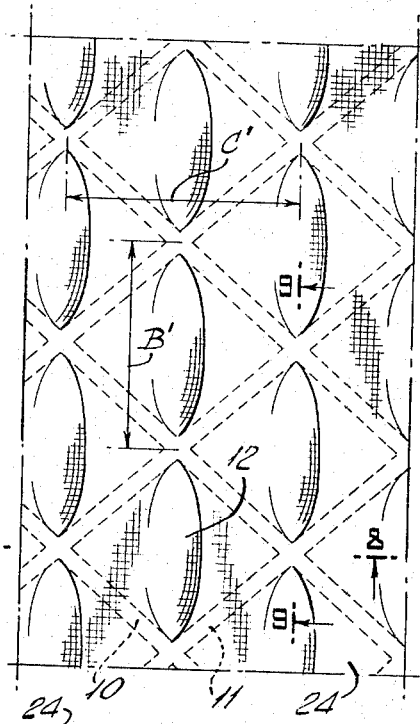
FIGURE 6 is a fragmentary view of the fabric shown in FIGURE 5 upon completion of the manufacture.
Figure 8:
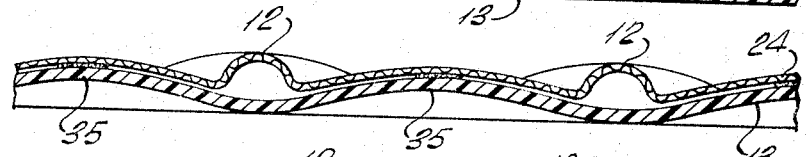
Figure 9:
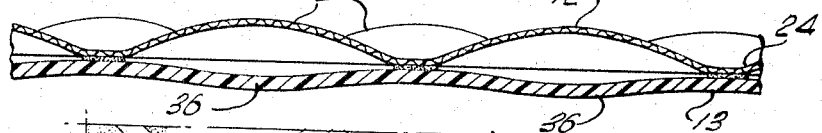

FIGURES 8 and 9 are cross-sectional views of FIGURE 6 taken along the lines 8—8 and 9—9 thereof.

Figure 10:
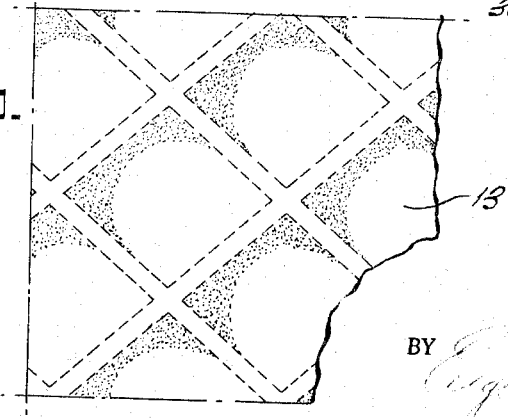

FIGURE 10 is a plan view of the reverse side of the fabric shown in FIGURE 6.

The material in accordance with the invention constitutes in one embodiment thereof a dual-ply fabric having a layer of an elastic or resilient material, one that may be readily stretched and which will contract upon being released, and an overlying layer of fabric, as, for instance, a woven fabric such as fabrics made of natural and synthetic materials. In the fabrication of this improved material, the preferred procedure involves the utilization of an adhesive which is first applied to the elastic backing material in a predetermined pattern, the elastic material is then stretched, and while in a stretched or elongated state, the overlying fabric is placed in contact therewith and held in pressure engagement for a sufficient period to insure adhesion of the two layers. When the applied adhesive is thoroughly dry, tension on the backing material is released causing the overlying woven or other fabric to gather in the areas outlined by the adhesive. When the material is stretched in one direction and when the adhesive is applied to the elastic backing along diagonal lines forming diamond shaped areas, the material will tend to gather primarily along lines within each diamond shaped area which are transverse to the direction of stretching.

For the purposes of this application, that form of the invention utilizing the diamond configuration will be described in detail, though it will be apparent that the method and apparatus in accordance with the invention may be utilized for forming contoured materials of other designs both regular and irregular. For instance, it is possible to apply the adhesive in a manner forming outlines of rosettes and other ornamental figures and then stretching the base material in one or both directions before applying the overlying fabric.

Figure 1:
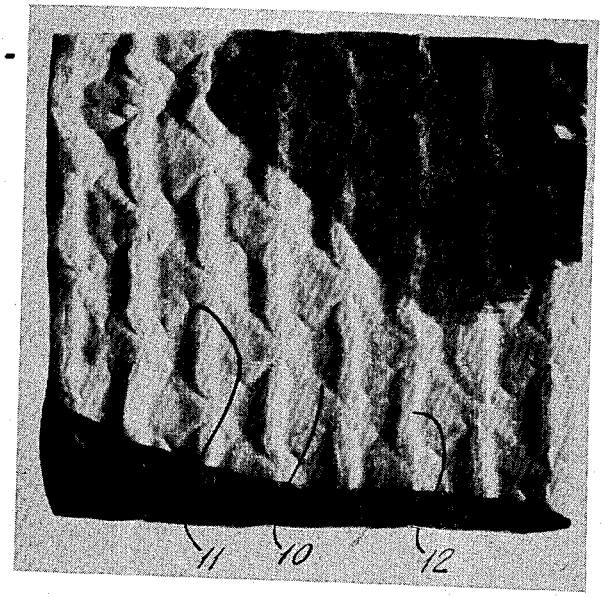
FIGURES 1 and 2 are photographic reproductions of the contoured side of a two-ply fabric in accordance with the invention.
Figure 2:
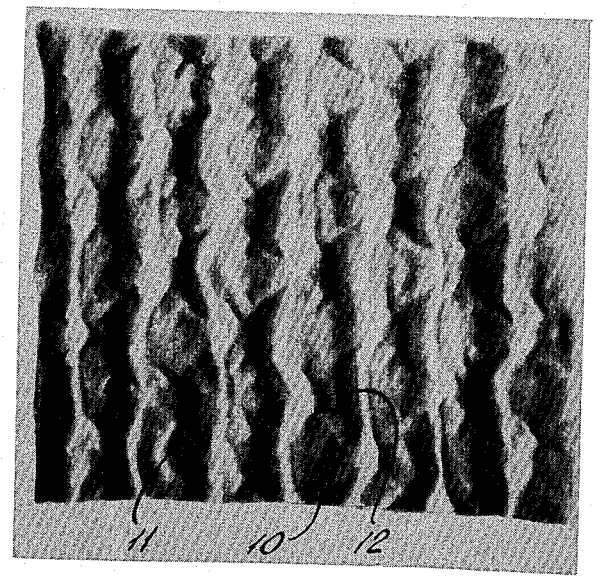

Reference is now made to the drawings and more specifically to FIGURES 1 and 2 which are photographic reproductions of actual fabrics made in accordance with the invention. The fabric shown in FIGURE 1 illustrates the effect obtained when utilizing a printed fabric placed on the base material, while FIGURE 2 hows the effect obtained with fabric of a solid color. In each instance, the lines along which the fabric is secured to the backing material may be observed, though these lines appear somewhat more clearly in FIGURE 1 and are denoted by the numerals 10 and 11. Since the base material was, in fact, elongated in the direction of the arrow A, upon contraction the excess material within each square or diamond gathered principally in the center as denoted by the numeral 12 with the principal gathering being generally along the vertical diagonal of each diamond as illustrated in the drawings. It will also be observed that the vertical threads of the fabric have an arcuate configuration within each diamond, and they curve inwardly from the right- and lefthand apices toward the central vertical dagonal. By following the single thread through the fabric, it will be found that it generally defines a serpentine path as it passes through successive diamonds or squares. While all materials generally follow the pattern illustrated in FIGURE 1, some materials produce a somewhat more irregular pattern as shown in FIGURE 2, though the principal gathering within each rectangle lies about the center of the square or the vertical diagonal as shown in the drawings, though in some instances, the gathering may be displaced to one side or the other of such vertical diagonals.

Fabrication of the material is accomplished by the apparatus diagrammatically illustrated in FIGURES 3 and 4. In FIGURE 3, the base material is generally denoted by the numeral 13. Such base material may be any of the elastic plastics such as a polyurethane foam, nylon woven to impart stretchability, and the like, provided that such material has sufficient elasticity to return to its original form after the elongating stresses are relieved.

In the instant embodiment of the invention, the base material 13 passes about a roller 14 and between cooperating rollers 15 and 16. The roller 16 is a printing roller for application of a suitable adhesive to the top surface of the base material 13. In the case of the fabrication of fabrics such as shown in FIGURES 1 and 2, the printing roller 16 is formed with a plurality of diagonally disposed grooves 17 and 18 as may be observed in Figure 4 which is a fragmentary plan view of a portion of the roller 16. Adhesive is applied to the roller 16 by means of an adesive roller 19 which is partially immersed in an adhesive bath 20. A doctor blade 21 is adjusted to permit a uniform layer of adhesive to stay on the roller 19. This adhesive is transferred to a second adhesive roller 22, which in turn applies the adhesive to the surface of the roller 16. The rollers 14 through 16, 19 and 22 are all driven at the same peripheral velocity so that at the time the adhesive is applied to the base material 13 by the adhesive roller 16, the base material has not been stretched or deformed in any way. The material 13 then passes over the surface of the laminating roller 23 which has a peripheral velocity slightly greater than the peripheral velocity of the printing roller 16 so that the material can be given a predetermined elongation. It has been found that if elongations of 5 to 10% are effected, attractive effects can be obtained. Since the base material 13 is actually elongated as it proceeds from roller 16 to the roller 23, the full elongation is effected at the time it actually contacts the roller 23. At this point, the overlying fabric 24 is guided onto the roller 23 by intervening rollers 25 and 26, the latter roller being adjusted to provide some pressure contact between the fabric 24 and the base material 13 in order to ensure the attainment of a firm bond between the two layers of material. When using heat responsive adhesives for more rapid setting, it is desirable to heat the roller 23 in any suitable manner as by the injection of steam through the axis of the roller and utilizing a roller in the form of a hollow drum. It would also be possible to use radiant heaters spaced about the surface of the drum as denoted by the numeral 27 and in some cases a radiant heater 28 may be placed in a position just following the roller 26 for imparting heat to the composite material as it leaves the roller 26. When using a heater such as the heater 28, it is, of course, important that only sufficient heat be provided to aid in setting the adhesive and without damaging either the fabric layer 24 or the base material 13. The combination material is then guided over a series of rollers 29 through 32, all driven at peripheral velocities equal to the peripheral velocity of the roller 23 so that the combined material is maintained in the stretched condition while passing over the rollers 29 through 32. These rollers are preferably heated to insure complete setting of the adhesive before the stress is released. As the material passes over the final roller 32, the stress is gradually released and the material adopts the form shown in FIGURES 1 and 2, whereupon the completed composite material 33 is wound upon a suitable roller or mandrel 34.

Figure 5:
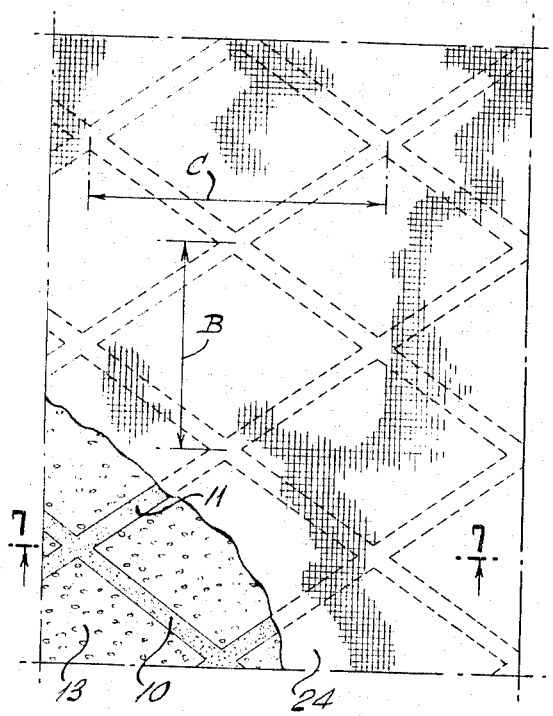
FIGURE 5 is a plan view of the fabric in accordance with the invention during one stage of the process of manufacture.

FIGURE 5 is a plan view of the fabric in accordance with the invention with the base material 13 in the elongated state and the overlying fabric 24 cemented to the base material by the diagonal lines of adhesive 10 and 11. It will be observed that the areas bounded by the lines of adhesive 10 and 11 are in the shape of elongated diamonds, whereas when the adhesive was first applied to the backing material 13, the areas bounded by the lines of adhesive were in the shape of squares positioned on the diagonal as is evident for instance in FIGURE 1. After the adhesive has set and the tension is removed from the fabric, the structure such as shown in FIGURE 6 is produced. Note the gathered areas 12 generally aligned with the diagonal of the rectangles or parellelograms as the case may be. By way of comparison, of FIGURES 5 and 6, it will be observed that the vertical distance between intersections as denoted by the arrow B of FIGURE 5 is precisely equal to the distance between intersections on the finished material shown in FIGURE 6 and denoted by the arrow B'. IN FIGURE 5, the arrow C denotes the horizontal distance between intersections and in FIGURE 6 the arrow C' indicates substantial shortening of the distance between corresponding intersections.

Figure 7:
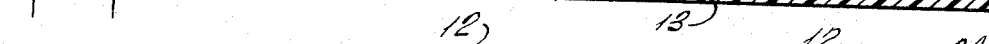
FIGURE 7 is a cross-sectional view of FIGURE 5 taken along the line 7—7 thereof.

During the process when the base material is stretched, the overlying fabric 24 lies flat against the base material as indicated in FIGURE 7.

The finished material as shown in FIGURE 6 is illustrated in cross section in FIGURES 8 and 9, and some curvature of the base material is produced at points 35, though this curvature has been somewhat exaggerated in order to illustrate the configuration of the material upon completion. The points 35 actually represent bulges which occur at the intersections of the adhesive lines 10 and 11, and the bulging is in evidence in both FIGURES 1 and 2. FIGURE 1 shows only a slight bulging at the intersections, while FIGURE 2 shows a somewhat more pronounced curvature at the intersections.

FIGURE 9 shows a slight reverse curvature at points 36 which occurs on the base material 13 directly beneath the gathered portions 12 of the overlying fabric.

A bottom plan view of the fabric in accordance with the invention is shown in FIGURE 10, the figure being shaded to show generally the nature of the bottom curvature as described above in connection with FIGURES 8 and 9.

While the invention as described above concerned principally the utilization of a two-ply material, it is of course possible to utilize multi-ply material in order to have two finished surfaces, both of which are contoured. Furthermore, the principle set forth in the fabrication of the fabrics shown in FIGURES 1 and 2 can be used for obtaining other designs either of a continuous or discontinuous form, the designs being determined by the pattern in which the adhesive is applied to the base material.

While only certain embodiments of this invention have been illustrated and described, it is apparent that alterations, modifications and changes may be made without departing from the true scope and spirit thereof as defined by the appended claims.

What I claim is:

1. The method of manufacturing a composite fabric comprising the steps of continuously transporting a sheet of elastic base material by rollers having a predetermined peripheral velocity, applying an adhesive continuously to successive portions of at least one side of said base material as it moves over said rollers, directing the printed base material over a roller having a peripheral velocity greater than said predetermined velocity to stretch successive portions of said base material, continuously applying an overlying layer of material to successive portions of the printed side of said base material to secure it to said base material and then releasing the tension on said base material and causing said overlying layer to gather in unadhered areas.

2. The method according to claim 1 including the step of heating said composite fabric with the base material in the stretched condition to accelerate setting of the adhesive.

3. Apparatus for manufacturing a composite fabric having a sheet of elastic base material and an overlying layer of surfacing material comprising a printing roller, a cooperating pressure roller, means for feeding said base material between said printing and cooperating roller at a predetermined velocity, means for continuously applying a coating of adhesive to said printing roller for transfer to said base material, a laminating roller including a cooperating pressure roller, said base material and said surfacing material being fed between said laminating roller and its cooperating pressure roller, said laminating roller having a peripheral velocity greater than the peripheral velocity of said printing roller to stretch said base material prior to the application of said overlying surfacing layer, and means for rapidly setting said adhesive whereby release of tension on said base material produces gathering of the surfacing material to produce a decorative contoured surface.

4. Apparatus for manufacturing composite fabric according to claim 3 wherein said means for setting the fabric comprises a hollow laminating drum and means for feeding steam into said drum.

5. Apparatus for fabricating a composite fabric according to claim 3 wherein said adhesive setting means comprises a plurality of spaced rollers carrying said composite fabric under tension, the last said rollers operating at the same peripheral velocity as the laminating roller.

6. Apparatus according to claim 3 wherein said adhesive setting means comprises radiant heating means.

7. The method of manufacturing a composite fabric comprising the steps of continuously transporting a sheet of elastic base material by spaced sets of rollers having predetermined peripheral velocities, stretching said base material to increase the area during transportation thereof, continuously applying an overlying sheet of unstressed material to said base material with an adhesive applied to selected areas of the base material to secure said sheets one to the other and then releasing the stress in said base material to cause said overlying layer to gather in the unadhered areas.

References Cited by the Examiner

UNITED STATES PATENTS

| | | | |
|---|---|---|---|
| 2,353,525 | 7/1944 | Teague | 161—73 |
| 2,413,970 | 1/1947 | Hawley | 161—76 |
| 2,679,968 | 6/1954 | Richter | 156—291 X |
| 2,740,741 | 4/1956 | Vaughan et al. | 156—495 X |

FOREIGN PATENTS 883,776  12/1961  Great Britain.

EARL M. BERGERT, *Primary Examiner.*

P. DIER, *Assistant Examiner.*